United States Patent
Greene et al.

(10) Patent No.: US 9,798,757 B2
(45) Date of Patent: *Oct. 24, 2017

(54) AUTOMATIC TRACKING OF CONTACT INTERACTIONS

(71) Applicant: Bullhorn, Inc., Boston, MA (US)

(72) Inventors: Geoffrey D. Greene, Dover, MA (US); Arthur L. P. Papas, Weston, MA (US); Richard L. Leeds, III, Natick, MA (US); Christian M. Baxter, Norwell, MA (US)

(73) Assignee: Bullhorn, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,493

(22) Filed: Oct. 29, 2015

(65) Prior Publication Data

US 2016/0110400 A1    Apr. 21, 2016

Related U.S. Application Data

(63) Continuation of application No. 12/883,229, filed on Sep. 16, 2010, now Pat. No. 9,189,770.

(51) Int. Cl.
*G06F 15/16* (2006.01)
*G06F 17/30* (2006.01)
(Continued)

(52) U.S. Cl.
CPC .. *G06F 17/30345* (2013.01); *G06F 17/30117* (2013.01); *G06F 17/30312* (2013.01);
(Continued)

(58) Field of Classification Search
CPC ............... G06F 15/16; G06F 17/30424; G06F 17/30345; G06F 17/30117;
(Continued)

(56) References Cited

U.S. PATENT DOCUMENTS 6,421,678 B2    7/2002  Smiga et al.
6,505,167 B1    1/2003  Horvitz et al.
(Continued)

FOREIGN PATENT DOCUMENTS

JP    07-093421    4/1995
JP    2002-132981  5/2002

OTHER PUBLICATIONS

International Preliminary Report on Patentability issued Mar. 19, 2013 for International Application No. PT/US2011/049545 filed Aug. 29, 2011.
(Continued)

*Primary Examiner* — Benjamin M Thieu
(74) *Attorney, Agent, or Firm* — Hamilton, Brook, Smith & Reynolds, P.C.

(57) ABSTRACT

Difficulty exists in ensuring a consistent level of activity tracking in a Customer Relationship Management System, Applicant Tracking System, or other tracking application among users (e.g., recruiter or sales representatives) within a single firm. This difficulty is due in part to the manual and time consuming mechanics of logging the activity. Example embodiments of the present invention include a system that automatically logs such activity. The system determines the sender and recipient of the email, as well as, whether the email contains calendar event information. The system then searches a database to determine if the sender or recipient is a contact in the tracking application. If a match is found, the system automatically adds the email to the contact's activity record as an inbound or outbound email or appointment. Activity tracking is, thus, consistently maintained among users of the firm, ensuring a higher quality of activity-based metrics.

21 Claims, 10 Drawing Sheets

(51) Int. Cl.
*G06Q 10/10* (2012.01)
*H04L 12/26* (2006.01)
*H04L 12/58* (2006.01)

(52) U.S. Cl.
CPC ....... *G06F 17/30424* (2013.01); *G06Q 10/10* (2013.01); *H04L 43/04* (2013.01); *H04L 51/046* (2013.01)

(58) Field of Classification Search
CPC . G06F 17/30312; H04L 51/046; H04L 43/04; H04L 51/04; H04L 12/5885; H04L 29/08675; H04L 51/34; H04L 67/22; G06Q 10/10; G06Q 10/06311; G06Q 10/107
See application file for complete search history.

(56) References Cited

U.S. PATENT DOCUMENTS

| | | | |
|---|---|---|---|
| 7,730,134 B2* | 6/2010 | Blagsvedt | G06Q 10/10 709/204 |
| 8,660,967 B2 | 2/2014 | Vemuri | |
| 8,918,466 B2 | 12/2014 | Yu | |
| 9,189,770 B2 | 11/2015 | Greene et al. | |
| 2002/0087647 A1 | 7/2002 | Quine et al. | |
| 2003/0065776 A1* | 4/2003 | Malik | G06Q 10/107 709/225 |
| 2003/0105824 A1 | 6/2003 | Brechner et al. | |
| 2003/0217181 A1 | 11/2003 | Kiiskinen | |
| 2004/0088362 A1 | 5/2004 | Curbow et al. | |
| 2004/0243677 A1 | 12/2004 | Curbow et al. | |
| 2005/0015505 A1* | 1/2005 | Kruis | H04L 41/0806 709/229 |
| 2005/0076037 A1 | 4/2005 | Shen | |
| 2005/0125408 A1* | 6/2005 | Somaroo | G06F 17/30286 |
| 2005/0198158 A1* | 9/2005 | Fabre | G06Q 10/107 709/206 |
| 2005/0223064 A1 | 10/2005 | Salerno et al. | |
| 2006/0048102 A1 | 3/2006 | Wenger | |
| 2006/0136357 A1* | 6/2006 | Rasmussen | G06F 17/30699 |
| 2006/0226232 A1* | 10/2006 | Helkio | H04M 1/72522 235/472.01 |
| 2007/0005713 A1* | 1/2007 | LeVasseur | H04L 51/36 709/206 |
| 2007/0083401 A1* | 4/2007 | Vogel | G06Q 10/02 705/5 |
| 2007/0299923 A1* | 12/2007 | Skelly | G06Q 10/107 709/206 |
| 2008/0095336 A1 | 4/2008 | Tysowski et al. | |
| 2008/0114838 A1* | 5/2008 | Taylor | H04L 51/04 709/206 |
| 2008/0215686 A1* | 9/2008 | Meredith | G06Q 10/107 709/206 |
| 2009/0037537 A1* | 2/2009 | Callanan | G06Q 10/107 709/206 |
| 2009/0106371 A1* | 4/2009 | Schmidt-Karaca | G06Q 10/107 709/206 |
| 2009/0144329 A1 | 6/2009 | Marlow | |
| 2009/0177754 A1 | 7/2009 | Brezina et al. | |
| 2009/0203352 A1 | 8/2009 | Fordon et al. | |
| 2009/0235280 A1 | 9/2009 | Tannier et al. | |
| 2009/0282348 A1 | 11/2009 | Mcbrearty et al. | |
| 2010/0174784 A1 | 7/2010 | Levey et al. | |
| 2010/0191566 A1 | 7/2010 | Loring et al. | |
| 2010/0223088 A1 | 9/2010 | Martin et al. | |
| 2010/0223089 A1 | 9/2010 | Godfrey et al. | |
| 2010/0278162 A1 | 11/2010 | Groux et al. | |
| 2011/0106736 A1* | 5/2011 | Aharonson | G06Q 10/109 706/12 |
| 2011/0125545 A1 | 5/2011 | Lehmann et al. | |
| 2011/0264663 A1 | 10/2011 | Verkasalo | |
| 2014/0136636 A1* | 5/2014 | Fabre | H04L 51/34 709/206 |

OTHER PUBLICATIONS

Notification of Transmittal of International Search Report and Written Opinion of PCT/US2011/049545 dated Apr. 9, 2012, entitled "Automatic Tracking of Contact Interactions".

Supplemental EP Search Report for EP 11825653 dated Jul. 10, 2014.

\* cited by examiner

AUTOMATIC TRACKING OF CONTACT INTERACTIONS

RELATED APPLICATION

This application is a continuation of U.S. application Ser. No. 12/883,229, filed Sep. 16, 2010, and issued as U.S. Pat. No. 9,189,770 on Nov. 17, 2015. The entire teachings of the above application is incorporated herein by reference.

BACKGROUND OF THE INVENTION

Customer Relationship Management (CRM) refers to processes implemented by a company to handle its interactions with its contacts (e.g., customers). Generally, information can be accessed and entered by employees of the company. An Applicant Tracking System (ATS) is a software application that enables the electronic handling of corporate recruitment needs. If hosted and accessed over the Internet, these systems may be known as Software-as-a-Service (SaaS). As used herein, the terms "CRM/ATS," "tracking application," and "tracking system" refer to any of these types of systems.

The business value of a tracking application is to enable a firm to improve its client interactions. This is done by collecting customer data and analyzing and measuring the data to understand customer needs and improve satisfaction, which leads to increased sales/placement opportunities. As part of the data collection, users (e.g., recruiters or sales representatives) use the tracking system to track all of their interactions with a contact or other company. Example interactions that can be tracked include email messages, telephone calls, appointments, interviews, submissions, and placements. A tracking application provides a method to create activity records such as, for example, notes, email messages, and meetings, which can link to a contact and allow tracking of ongoing interactions with the contact. These activity records typically contain the date and time, title, short description, long description, ability to add an email or copy an email into the description, and the type of interaction typically defined by the user, such as, for example, phone contact, interview, email, or notes. When the activity is logged, a firm can then report on the logged data, measure each user's activity level, and analyze productivity at an individual, team, or firm level.

SUMMARY OF THE INVENTION

One problem with tracking applications today is that existing systems or methods require the user to either (1) manually add email messages to the tracking system, or (2) use other applications to tag email messages to a specific contact that will, in turn, associate the email with that contact in the tracking application. With either of these methods, user action is required and, as a result, there is a high probability that email message activity between a contact and a user will not be tracked consistently across the entire firm.

While some tracking systems have the ability to reduce the steps of fully manual cut-and-paste methods for getting email message activity into the system, many of those systems require the user to associate a message with a contact within the Mail User Agent (MUA) email client software, and at a later point in time, when there is an internet connection, the MUA synchronizes with the tracking system. Other tracking systems require the user to take many manual actions to track ongoing interactions with the contact, including adding a tracking address in the BCC line within the MUA when sending email. Using such a BCC method, the system can only track outgoing messages, and does not track email that comes into the MUA from the Internet. To track those incoming messages, the user must resend them to the tracking system manually. Further, solutions that require software to be installed into the MUA do not work when the user sends or receives email from, for example, a mobile device or a web-based MUA (such as Microsoft Web Access).

Example methods and systems are disclosed herein to solve these problems. One example is a computer-implemented method of tracking correspondence between users and contacts in a customer relationship management or applicant tracking system (CRM/ATS, tracking application, or tracking system). The method involves monitoring electronic mail messages between a user and a contact, and upon detecting an electronic mail message, automatically copying the electronic mail message to the tracking system. The electronic mail message is then parsed to determine a sender and a recipient of the message. According to the example method, a database of the tracking system is searched for the sender and the recipient, and if the sender or recipient is found in the database, the electronic mail message is automatically (without user manual operation or command) added to an activity record for that contact.

In some embodiments, the method may include automatically adding an indication as to whether the activity is inbound activity or outbound activity, and then automatically adding the electronic mail message to an activity record for the sender of the message if it is an inbound message, or to an activity record for the recipient of the message if it is an outbound message. The electronic mail message copy may be deleted if neither the sender nor recipient is found in the database.

If the electronic mail message includes an electronic invitation for a calendar event, information about the calendar event may be automatically stored in the database, the database may be automatically searched for an invitee of the calendar event, and information about the calendar event may be automatically added to the activity record for the invitee. If the electronic invitation is a cancelation of a calendar event, information about the calendar event may be automatically deleted from the database and from the activity record for any invitee of the calendar event.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The embodiments disclosed herein allow interactions (e.g., electronic email messages) to be received from a third party Mail Transfer Agent (MTA) and for the interactions to be automatically added (i.e., without user manual steps or interaction) to a tracking system as cataloged activity associated with a contact in the tracking system. In many embodiments, the tracking systems, in an automated fashion, can identify the recipients of the interactions, identify the sender of the interactions, and identify any email attachments, such as an appointment (e.g., attached .ics file). The tracking systems can also automatically perform a search in the system's database for each identified recipient and sender and, if found, automatically add the interaction (e.g., email message) as inbound/outbound mail activity. The tracking systems can further automatically create or update an appointment or meeting (e.g., calendar event) based on metadata contained in the appointment or meeting (e.g., .ics file attachment).

The disclosed tracking systems facilitate automatic activity tracking in a tracking system when the Mail User Agent (MUA) is a thick mail client, such as, for example, Microsoft Outlook or Thunderbird, and connected to a MTA, such as, for example, Microsoft Exchange. The tracking systems also facilitate automatic activity tracking when the user's MUA is a thin web mail client, such as, for example, Microsoft Outlook Web Access, and connected to a MTA, such as Microsoft Exchange. The tracking systems further facilitate automatic activity tracking when the user's MUA is a handheld device, such as, for example, an iPhone, Android Operating System (OS), or Blackberry device, and connected to a MTA, such as Microsoft Exchange.

Use of the disclosed methods or systems results in an ability to automatically link and store a copy of (1) inbound email in the sender's record in the tracking system by sending a copy of the inbound email from the user's mail server to the tracking application, (2) outbound email in the recipient's (To, CC) record in the tracking system by sending a copy of the outbound email from the user's mail server to the tracking application, and (3) calendar events in a contact's record in the tracking application by processing a copy of the calendar event email from the user's mail server in the tracking application.

To enable the above features, a company, or other entity, may install a Mail Transfer Agent (electronic mail server) into its tracking application to receive emails forwarded to the company from another entity's primary MTA (such as Microsoft Exchange). When an email is received by the company's MTA from a user's primary MTA, the system processes the email to automatically add the email, along with any detailed metadata, into the tracking system. When the message arrives, the system parses the message to determine the sender and recipients of the message. The system then performs a search in the system's database for the sender and each recipient. If the sender or recipient is located, the system automatically adds the email to the message activity record for each contact found in the database. As noted above, the system may also track all email activity automatically when a user sends or receives email from a mobile device (e.g., iPhone, Blackberry, Android, or Windows Mobile device) or via a web-based MUA (e.g., Microsoft Web Access and Gmail).

Figure 1:
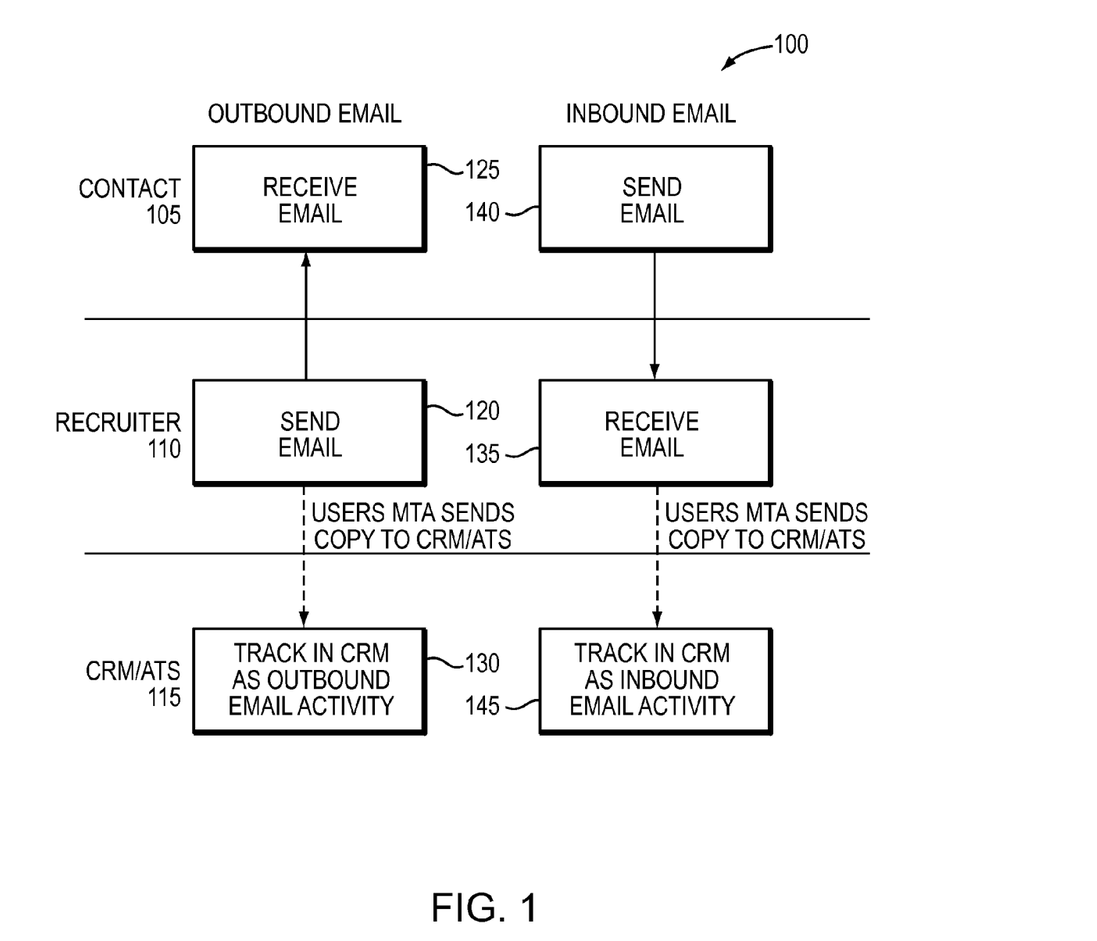
FIG. 1 is a flow chart illustrating tracking of sent and received email in embodiments of the present invention.

FIG. 1 is a flow chart illustrating an example embodiment's process 100 for tracking of sent and received email. An email may be sent (120) from a user (e.g., recruiter) 110 of a firm/company to a contact 105 (e.g., job seeker), upon which the email is both received (125) by the contact 105 and automatically inserted (130) into the firm's/company's tracking system 115. Additionally, an email may be sent (140) from the contact 105 to the user 110, upon which the email is both received (135) by the user 110 and automatically inserted (145) into the tracking system 115.

Figure 2:
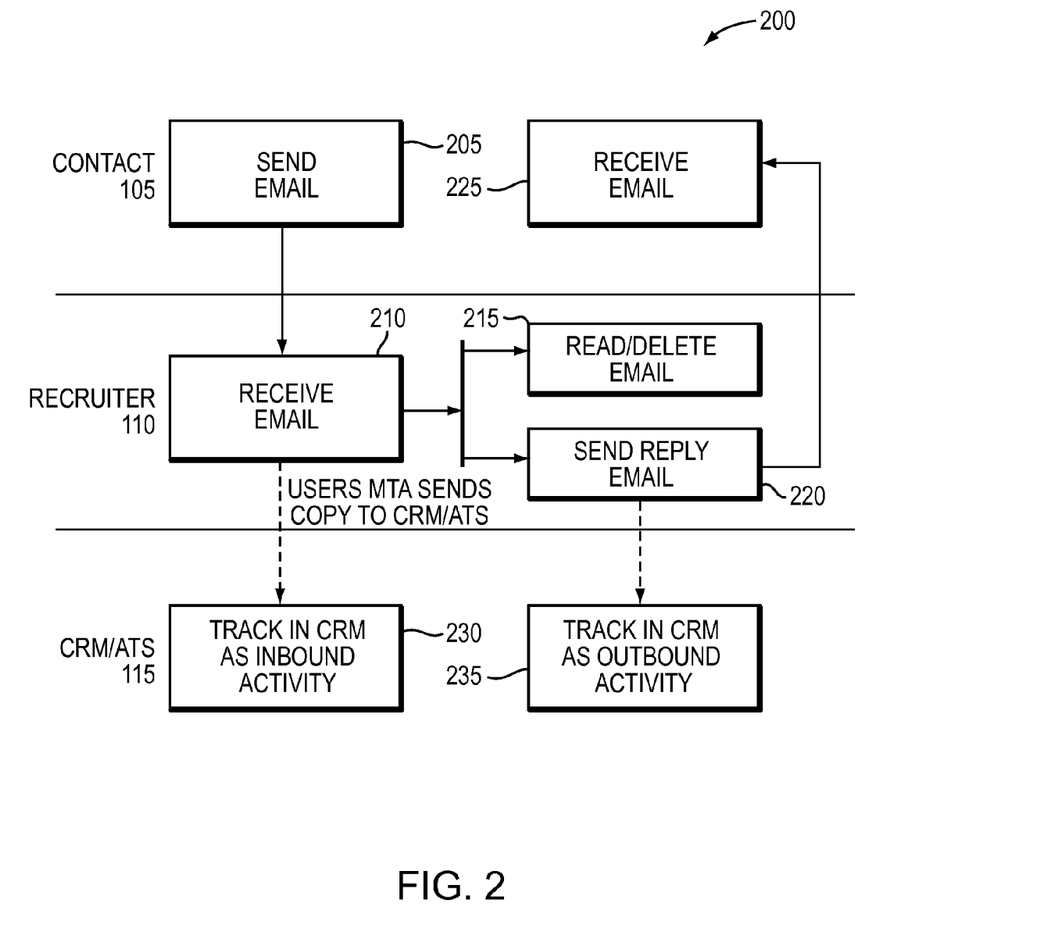
FIG. 2 is a flow chart illustrating tracking of sent and received email, including tracking of a reply to an email from a contact in embodiments of the present invention.

FIG. 2 is a flow chart illustrating an example embodiment's process 200 for tracking of sent and received email, including tracking of a reply to an email from a contact. An email may be sent (205) from a contact 105 to a user 110, upon which the email is both received (210) by the user 110 and automatically copied (230) to the tracking system 115. The user 110 may read the email and then either delete (215) the email or reply (220) to the email. If the user 110 replies to the email, the reply is both received (225) by the contact 105 and automatically copied (235) to the tracking system 115.

Figure 3:
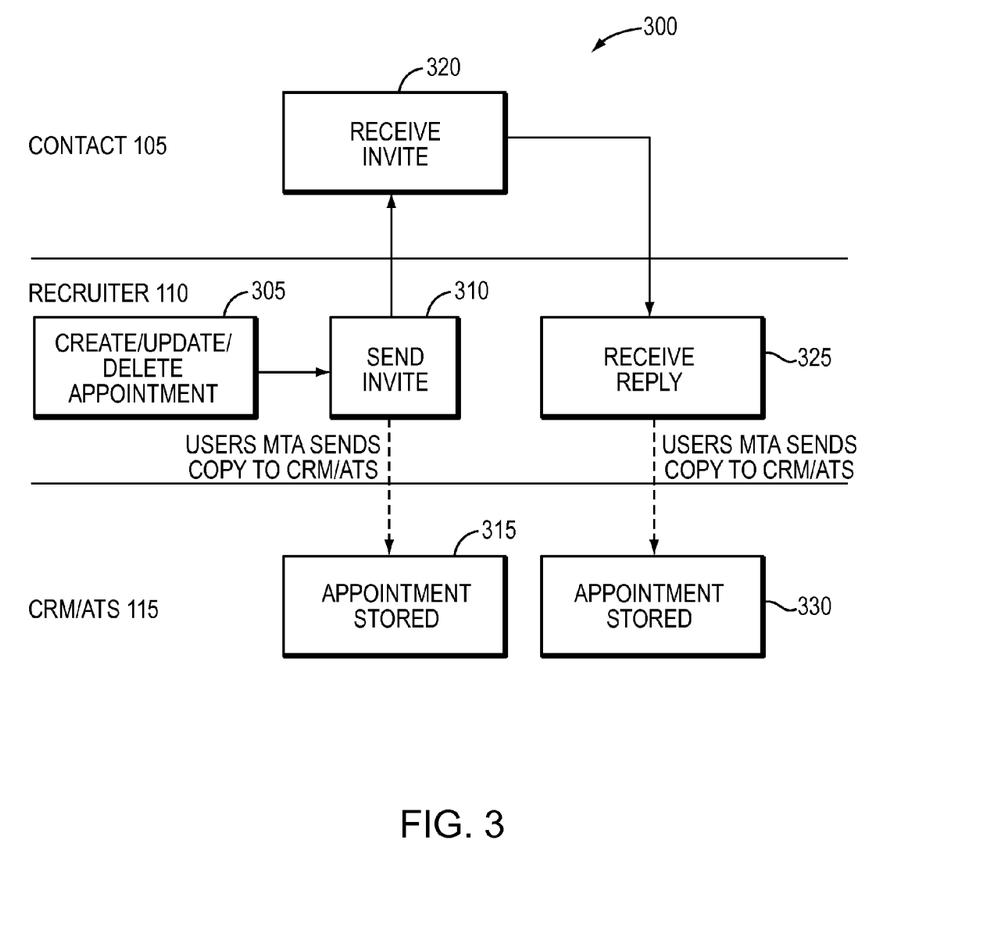
FIG. 3 is a flow chart illustrating tracking of an electronic invitation sent from a user (e.g., recruiter) to a contact in embodiments of the present invention.

FIG. 3 is a flow chart illustrating an example embodiment's process 300 for tracking of an electronic invitation sent from a user (e.g., recruiter) to a contact. A user 110 may create, update, or delete a calendar appointment (305), and send (310) a corresponding electronic invitation to a contact 105. When the invitation is sent, it is automatically copied (315) to an tracking system 115, and is also received (320) by the contact 105. The contact 105 may then reply to the invitation, upon which the user 110 receives (325) the reply and the reply is copied (330) to the tracking system 115. It should be understood that the contact 105 could similarly send an electronic invitation to the user 110, and process 300 would similarly handle that invitation.

Figure 4:
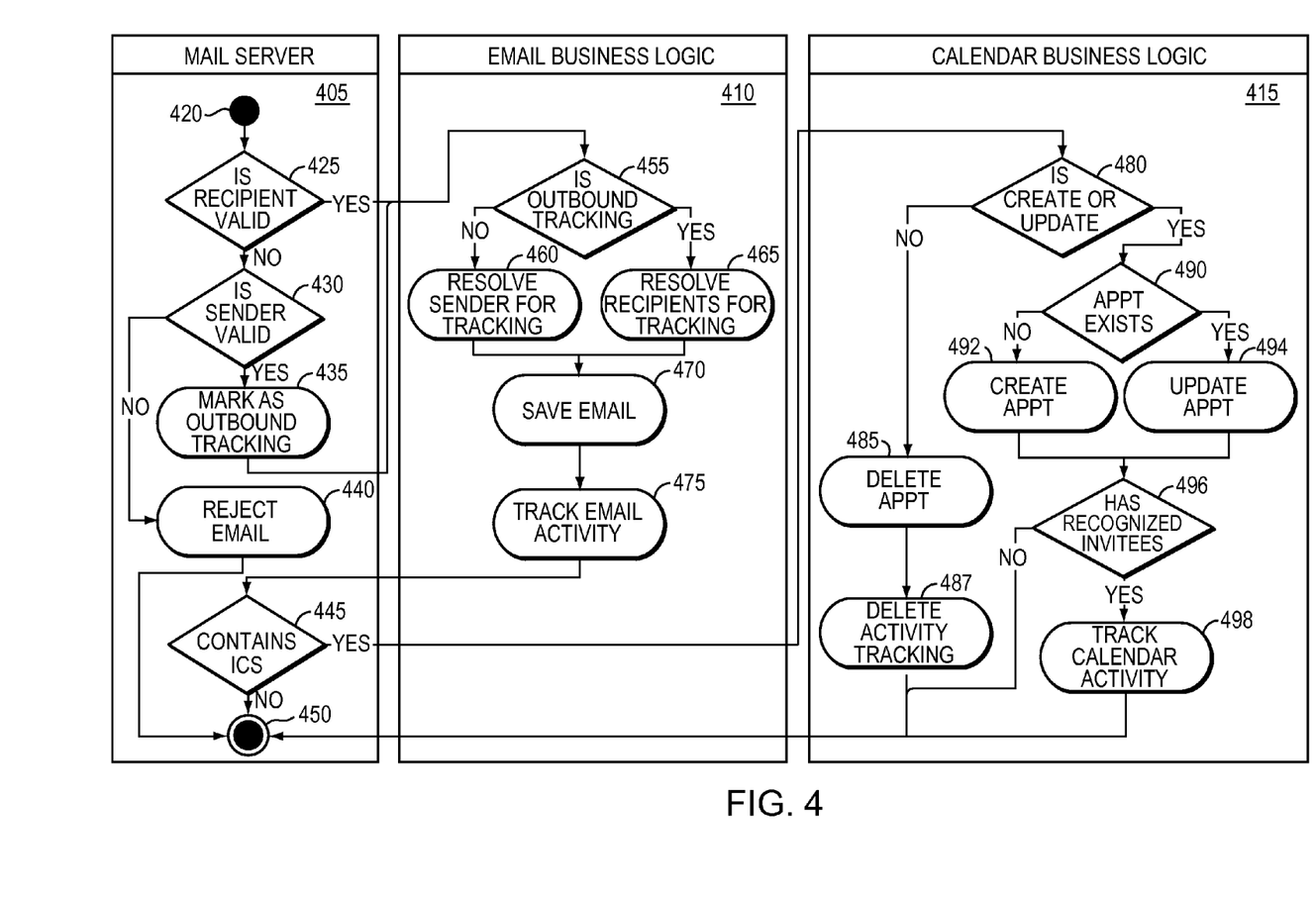
FIG. 4 is a detailed flow chart illustrating tracking of sent and received email and tracking of electronic invitations in an example tracking system embodying the present invention.

FIG. 4 is a detailed flow chart illustrating an example embodiment's process 400 for tracking of sent and received email and tracking of electronic invitations in an example tracking system. At the starting point of the example tracking system, a mail message is delivered to a Mail Transfer Agent (MTA) (420). The mail message comes into the MTA based on one of the following example scenarios: (1) Someone sends an email to a company user, for which the company owns a Mail eXchange (MX) record. This is an inbound mail scenario. (2) Someone sends an email to a company user, for which the company does not own an MX record, but the user's mail system is configured to forward inbound mail to the tracking system (via "journaling" for example) for tracking purposes. (3) A company user uses his own mail system (e.g., Microsoft Exchange) to send an email, where that system is configured to forward sent mail to the tracking system for tracking purposes.

Using the "RCPT TO" value from the Simple Mail Transfer Protocol (SMTP) transmission, a custom Mail Transfer Agent (MTA) of the company's system attempts to validate the recipient of the mail message by accessing the tracking system to determine whether the email address is a valid company user (425). If the recipient is not deemed to be valid, then the system process 400 attempts to validate the sender of the email in the same manner, in which case this would be a sent items tracking situation (430). If the sender is determined to be valid, the message is marked as a sent items tracking situation so that the downstream logic of the system is aware that it is not an inbound mail message (435). If neither the recipient nor the sender are determined to be valid, the message is rejected at the SMTP handoff point (fast fail, no bounce back) (440) and the process 400 flow ends (450).

If either the sender or recipient is determined to be valid, a check is made to determine whether the message is an inbound or outbound scenario (455). In an inbound scenario, the tracking is applied to the sender of the message; thus, the system process 400 determines whether the sender is a recognized person (e.g., candidate, contact) in the company's tracking system (460). The system process 400 may make this determination by querying a database of the tracking system. In an outbound tracking scenario, the tracking is applied to the recipients of the message; thus, the system process 400 determines whether each individual recipient (i.e., to, cc, bcc field) is a recognized person (e.g., candidate, contact) in the company's tracking system (465). Information about the email (e.g., subject, body) is then stored in the tracking system (470). If there are relevant people to track against (i.e., sender for inbound scenario, or recipients for outbound scenario) as determined above, then the saved email information is associated with those people so that it can be viewed in relation to them, for example, on an activity tracking page (475).

After the mail message tracking determinations are made, a check is made to determine whether there is any "calendar" data associated with the email message (445). This check may be performed by determining whether if there is a ".ics" attachment, for example, or by determining whether there is a MIME body part with a content-type of "text/calendar." If there is no "calendar" data, the process 400 flow ends (450). If there is calendar data, then the system process 400 determines whether the calendar data is a create/update type (e.g., method types "publish" or "request") or a delete type (e.g., method type "cancel") (480).

If the calendar data is create/update calendar data, the system process 400 determines whether any "appointment" referenced (490) in the calendar data currently exists in the tracking system. If an appointment does not currently exist, it is created in the tracking system using information supplied in the calendar data of the email (492). If the appointment already exists, then the information is updated for that appointment in the tracking system according to the newly-supplied calendar data (494). At this point, a check (496) is made to determine whether any of the appointment invitees are recognized people (e.g., candidates, contacts) in the company's tracking system using the email addresses contained in the calendar data. If there are no recognized people, the process 400 flow ends (450). If there are recognized people, then the appointment is associated with those recognized people in the company's tracking system so that the appointment information can be viewed, for example, on an activity tracking page (498). The process 400 flow then ends (450). If, on the other hand, the calendar data is for a cancel scenario, then the referenced appointment is removed (485) from the tracking system. Any tracking references are also be removed (487) so the appointment no longer appears in any activity tracking information. The process 400 flow then ends (450).

Figure 5:
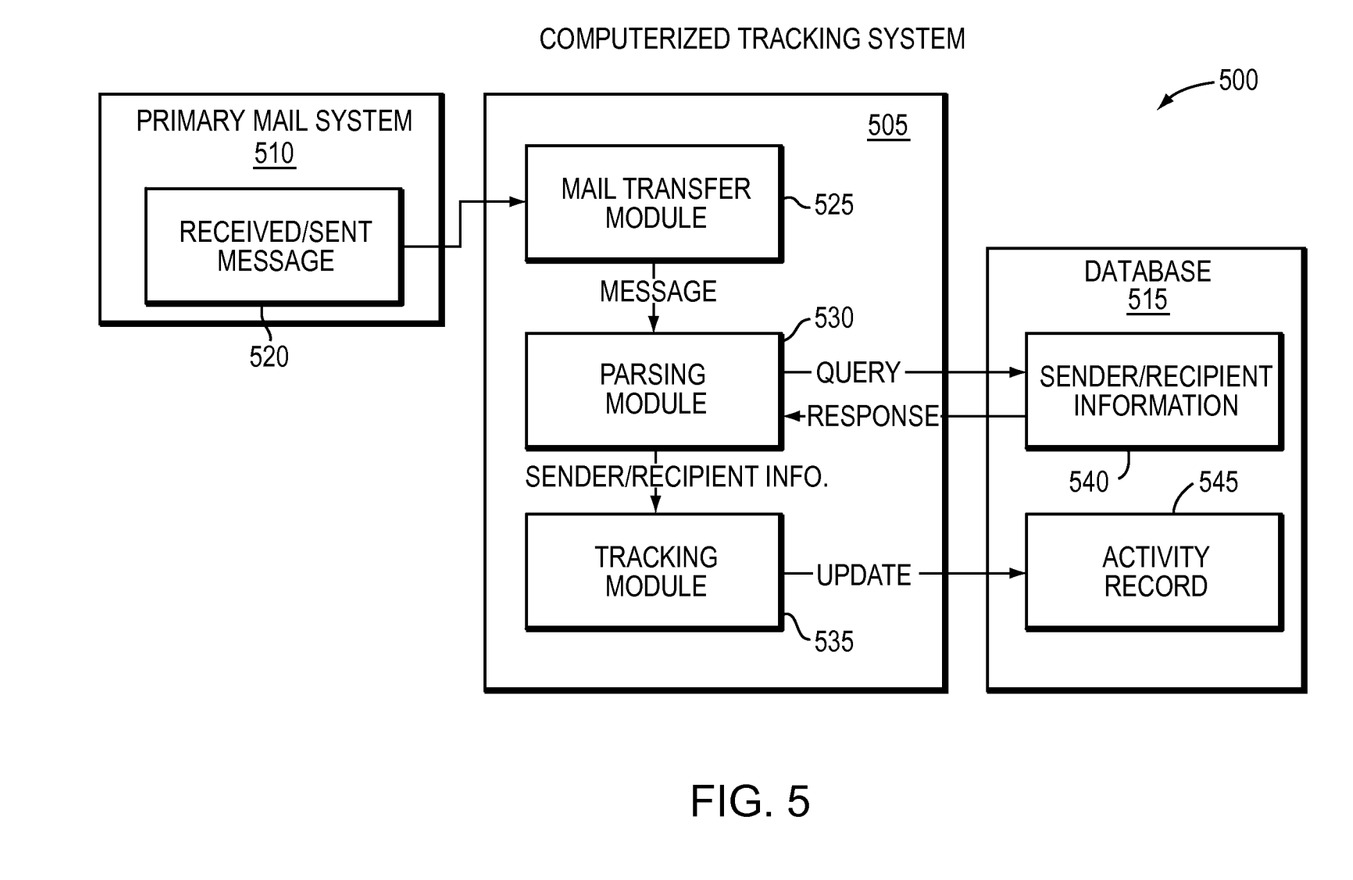
FIG. 5 is a block diagram illustrating components of an example tracking system embodying the present invention and flow of information among the components.

FIG. 5 is a block diagram illustrating components of an example tracking system and flow of information among the components. The example system 500 tracks correspondence between users and contacts, and includes in a subsystem or process 505 (1) a mail transfer module 525 that monitors electronic mail messages between a user and a contact, and that automatically copies the electronic mail message to the tracking system 500 upon detecting an electronic mail message 520 from a primary mail system 510, (2) a parsing module 530 that parses the electronic mail message 520 to determine a sender and a recipient of the message 520, and that searches a database 515 of the tracking system (e.g., send a query to the database 515) for information 540 about the sender and the recipient, and (3) a tracking module 535 that adds the electronic mail message 520 to an activity record 545 for the contact if the sender or recipient is found in the database 515.

As in other embodiments, the tracking module 535 may add an indication to the activity record 545 as to whether the activity is inbound activity or outbound activity. The tracking module 535 may further add the electronic mail message to an activity record 545 for the sender of the message 520 if it is an inbound message, or to an activity record 545 for the recipient of the message 520 if it is an outbound message. The tracking module 535 may, alternatively, delete the electronic mail message copy if neither the sender nor recipient is found in the database 515.

In addition, the parsing module 530 may determine whether the electronic mail message 520 includes an electronic invitation for a calendar event. If such an electronic invitation exists, the parsing module 530 may further search the database 515 for an invitee of the calendar event. The tracking module 535 then stores information about the calendar event in the database 515, and may add information about the calendar event to the activity record 545 for the invitee, if any. In an event the electronic invitation is a cancelation of a meeting or appointment, for example, the tracking module 535 then deletes information about the calendar event from the database 515 and deletes information about the calendar event from the activity record 545 for any invitees of the calendar event.

Figure 6:
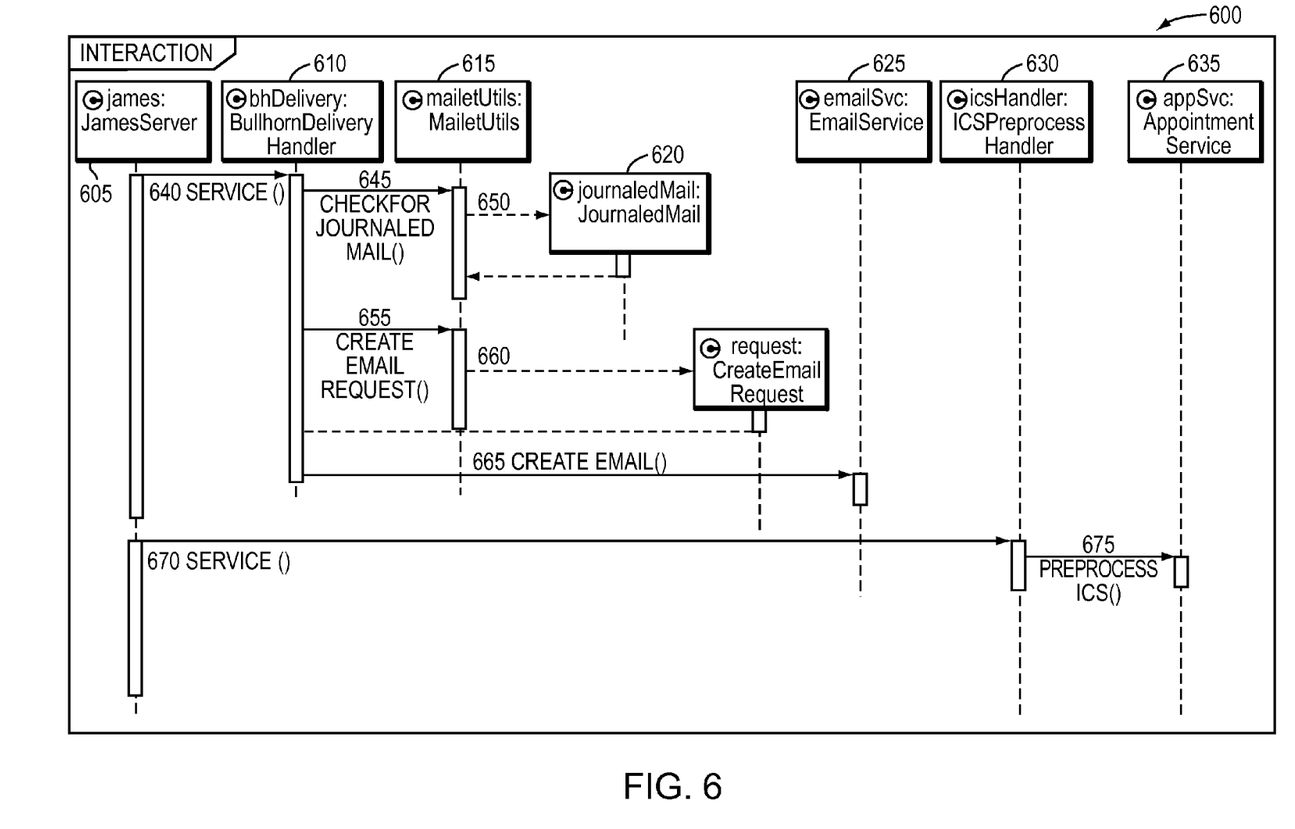
FIG. 6 is a flow diagram illustrating a sequence for receiving a mail message at a mail server and processing the message through an example tracking system.

FIG. 6 is a flow diagram illustrating a sequence 600 for receiving a mail message at a mail server and processing the message through a tracking system. The example sequence 600 assumes that the recipient of the message has already been validated. In the example sequence 600, the mail delivery chain 605 calls (640) a delivery handler 610 (a Mailet) service(Mail) method. The delivery handler 610 calls (645) a MailetUtils 615 checkForJournaledMail(MimeMessage) operation. If the message has a single embedded email attachment and the message is to a single recipient and contains journaling information in the body, then the message is determined to be a journaled message (e.g., from Exchange Journaling) and a JournaledMail 620 object is created (650) and returned containing the actual message to deliver. The delivery handler 610 calls (655) a createEmailRequest(MimeMessage) on MailetUtils 615. In this operation, the details of the message are copied onto a new instance of CreateEmailRequest (660), which is used for an upcoming service call. The delivery handler 610 calls (665) createEmail(CreateEmailRequest) on an EmailService 625 class. The specific details of this sequence is represented in greater detail below in FIG. 7. Additionally, if the mail delivery chain 605 detects a .ics file attached to the message, then it invokes (670) the service(Mail) operation on a ICSPreprocessHandler 630 (a Mailet). The ICS handler 630 then calls (675) a preprocessICS(PreprocessICSRequest) on an AppointmentService 635 class. The specifics of this operation are covered in more detail below in FIG. 8.

Figure 7:
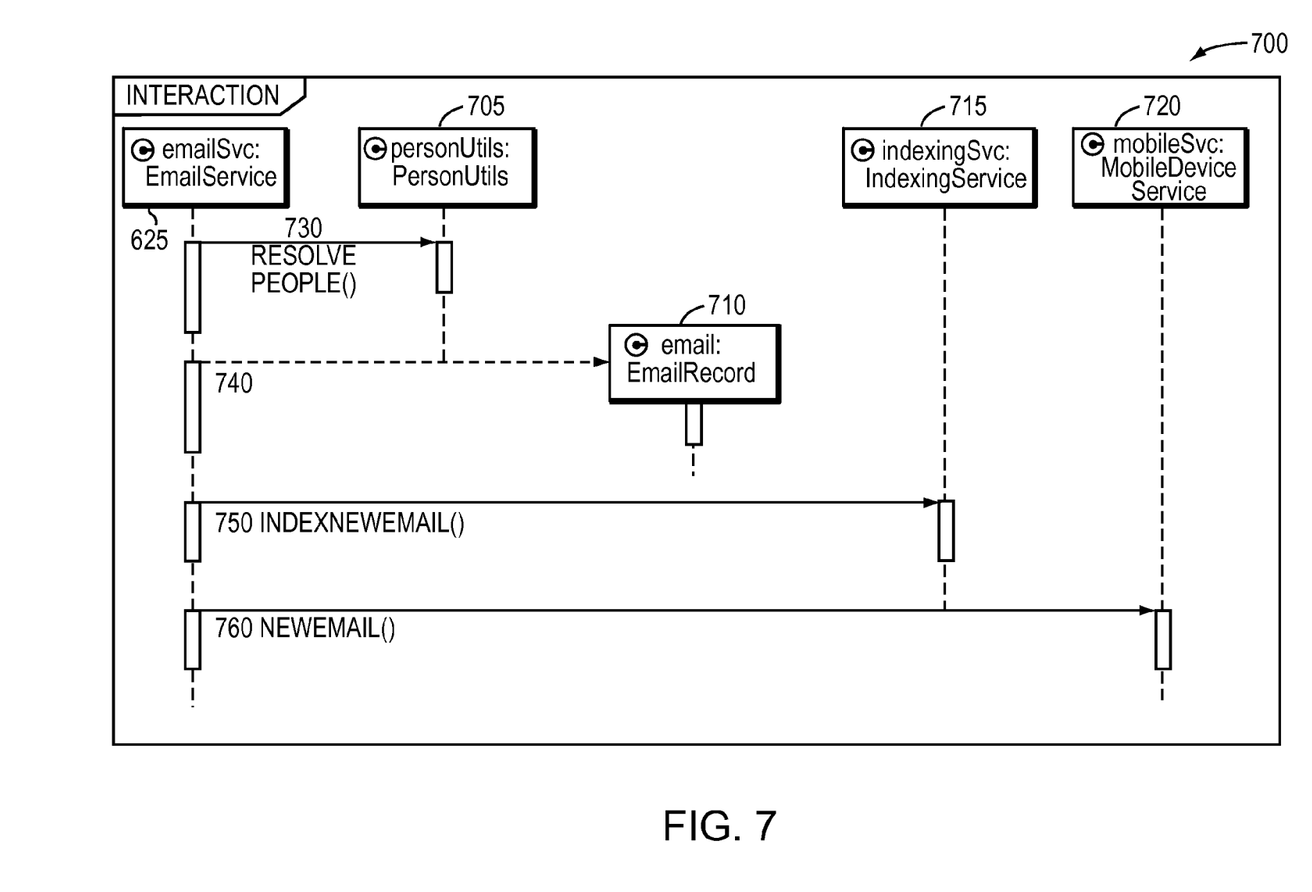
FIG. 7 is a flow diagram illustrating a sequence for creating an email in an example tracking system and tracking it against appropriate individuals.

FIG. 7 is a flow diagram illustrating a sequence 700 for creating an email in an example tracking system and tracking it against appropriate individuals. In the example sequence 700, the EmailService 625 class calls (730) resolvePeople(List<Person>) on a PersonUtils 705 class. In an inbound tracking case, the sender of the message is resolved into a person record. In an outbound tracking scenario, the recipients (To, Cc, Bcc) of the message are resolved into person records. Either way, the resolution logic may be as follows: If the email address matches an internal person, then that match wins against all other matches. If no internal match, then next is a private Client Contact owned by the context user (sender in outbound, recipient in inbound). If no private Client Contact, then next is a private Candidate owned by the context user. If no private Candidate, then next is a public Client Contact. If no public Client Contact then last is a public Candidate. After the resolution logic completes the EmailService 625 creates (740) a new EmailRecord 710 to store the information tied to the email received in the tracking system database. In an inbound tracking case, the sender is tied to the EmailRecord 710 to track against the sender. For an outbound case, each resolved recipient is tied to the EmailRecord 710 to track against the recipients. After creating the EmailRecord 710 in the database, EmailService 625 calls (750) an indexNewEmail(EmailRecord) on an IndexingService 715 to add email data to an email Lucene Index so that it is available in fast search features in the tracking system. After indexing the email, EmailService 625 calls (760) a newEmail(EmailRecord) on a MobileDeviceService 720 to make the new email available to the context users' mobile device if applicable.

Figure 8:
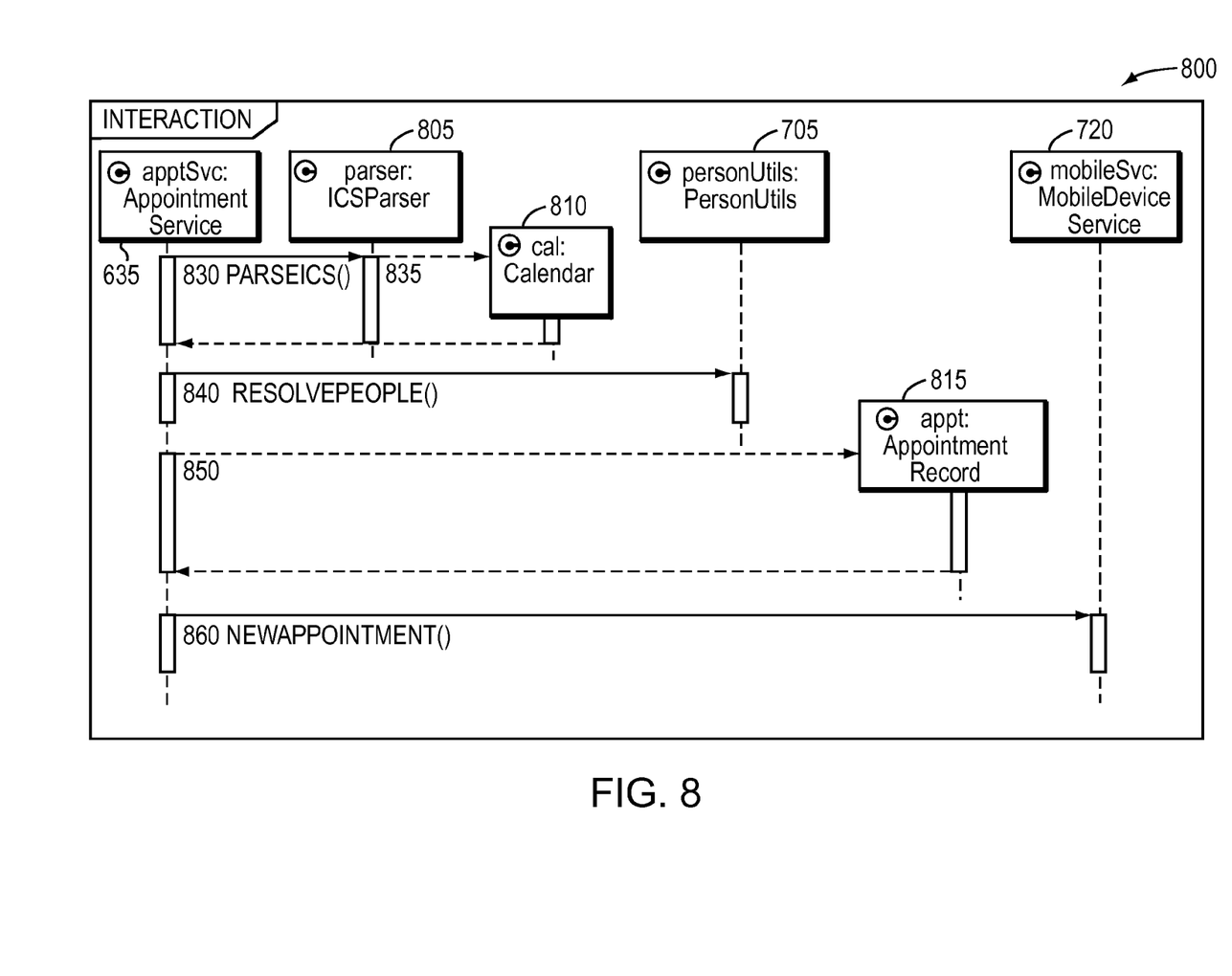
FIG. 8 is a flow diagram illustrating a sequence for preprocessing an .ics file tied to an email.

FIG. 8 is a flow diagram illustrating a sequence 800 for preprocessing an .ics file tied to an email. The example sequence 800 addresses a case in which an appointment from the .ics file does not yet exist in the tracking system. In the example sequence 800, the AppoinementService 635 class calls (830) parseICS(String) on a ICSParser 805. In the parseICS 805 operation, a new Calendar 810 object is created (835) from the data contained in the .ics file (using, e.g., a iCal4j library). For tracking purposes, AppointmentService 635 calls (840) resolvePeople(List<Person>) on PersonUtils 705 to resolve any invitees from the .ics into people records in the tracking system (see e.g., FIG. 7). A new AppointmentRecord is created (850) and persisted to the tracking system database. At this point, any invitees that resolved into people records in the context of the owner are tied to the AppointmentRecord 815 so the appointment tracks against them. AppointmentService 635 calls (860) newAppointment(AppointmentRecord) on the MobileDeviceService 720, which makes the new appointment available on the device of the owner.

Figure 9:
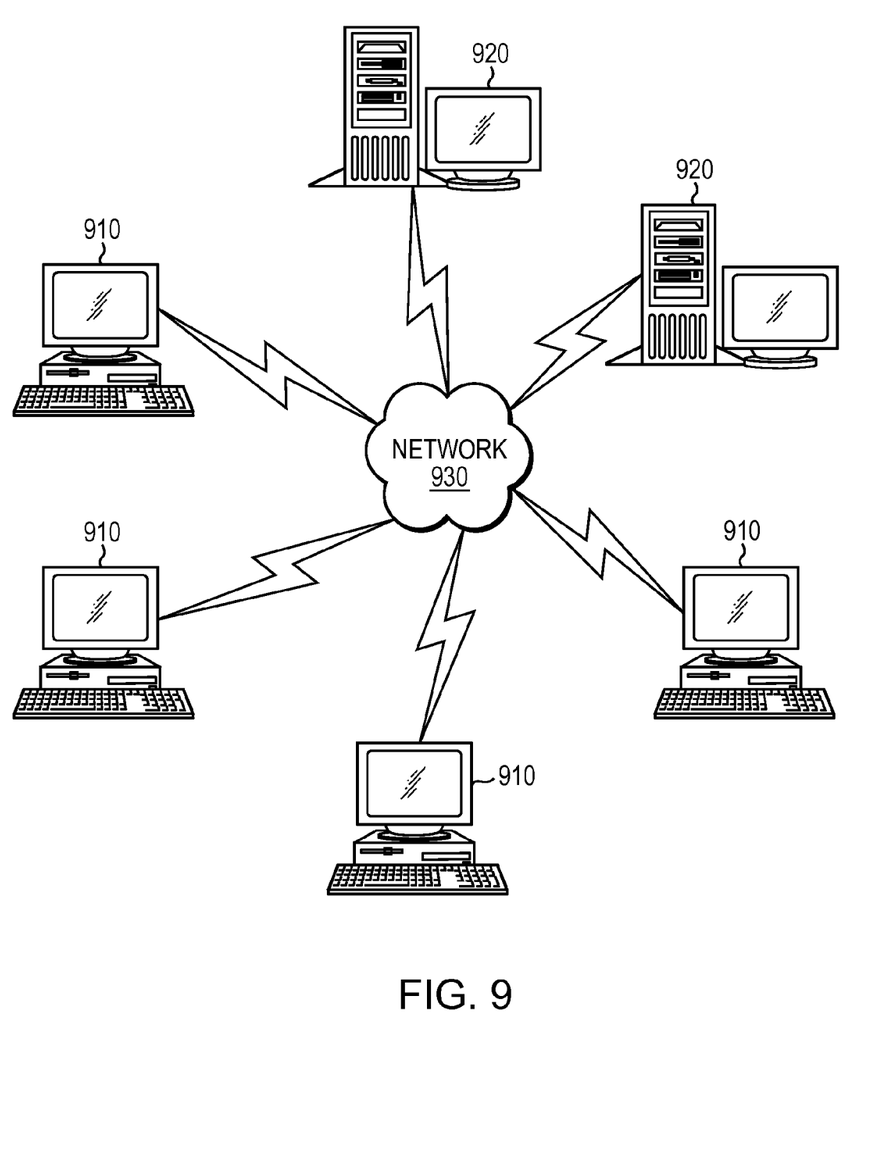
FIG. 9 is a schematic view of a computer network in which the example embodiments disclosed herein may operate.

FIG. 9 is a schematic view of a computer network in which embodiments of the present invention may operate. Client devices 910 and server devices 920 provide processing, storage, and input/output devices executing application programs and the like. Client devices 910 can also be linked through a communications network 930 to other computing devices, including other client devices 910 and server devices 920. The communications network 930 may be part of a remote access network, a global network (e.g., the Internet), a worldwide collection of computing devices, local area or wide area networks, and gateways that currently use respective protocols (TCP/IP, Bluetooth, etc.) to communicate with one another. Other electronic device/computer network architectures are also suitable.

Figure 10:
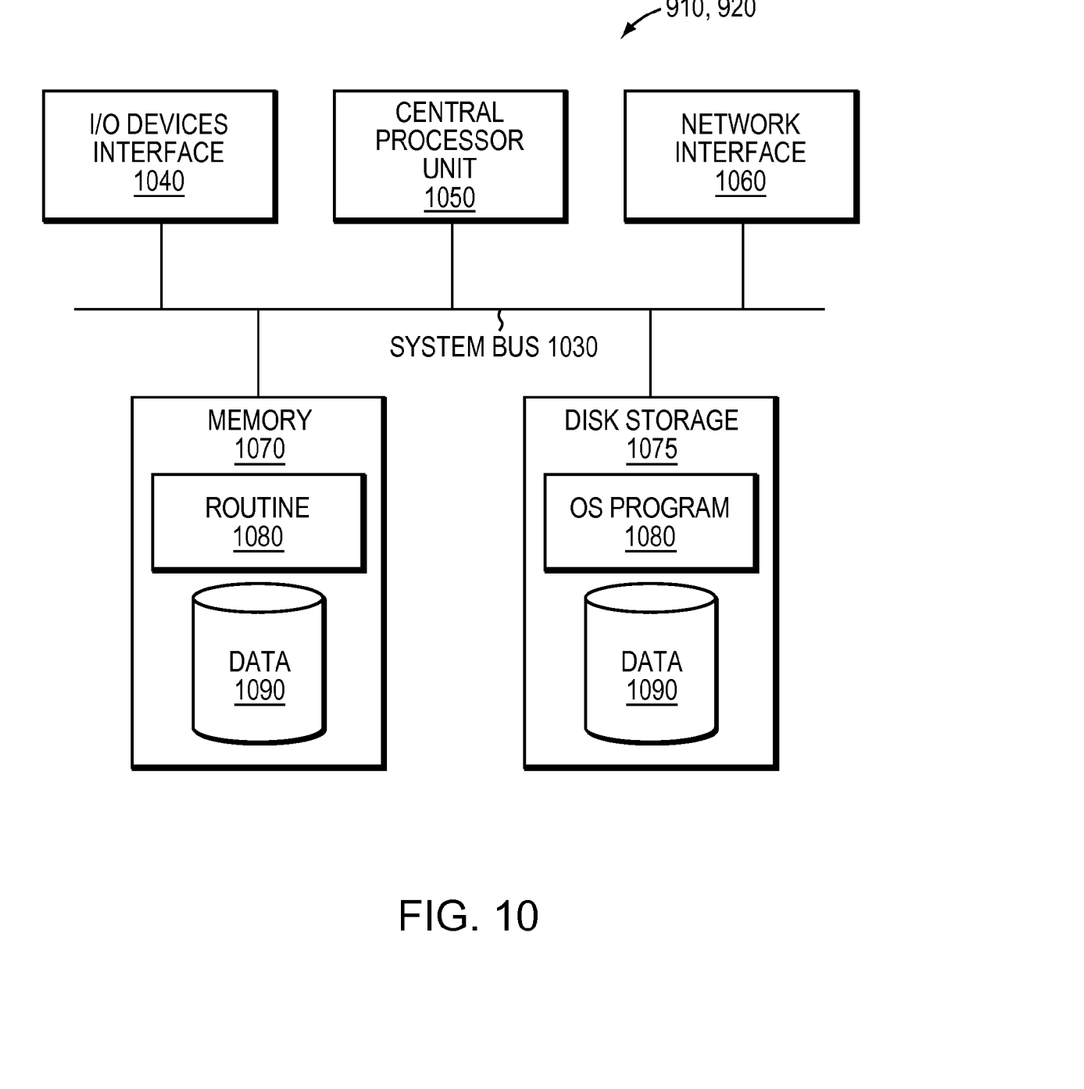
FIG. 10 is a block diagram of a computer node/device in the network of FIG. 9.

FIG. 10 is a block diagram of a computer node/device 910, 920 in the network of FIG. 9. Each device 910, 920 contains a system bus 1030, where a bus is a set of hardware lines used for data transfer among the components of a device or processing system. The bus 1030 is essentially a shared conduit that connects different elements of a device (e.g., processor, disk storage, memory, input/output ports, network ports, etc.) that enables the transfer of information between the elements. Attached to the system bus 1030 is an I/O device interface 1040 for connecting various input and output devices (e.g., keyboard, mouse, displays, printers, speakers, etc.) to the device 1010, 1020. A network interface 1060 allows the device to connect to various other devices attached to a network (e.g., network 930 of FIG. 9). Memory 1070 provides volatile storage for computer software instructions 1080 and data 1090 used to implement an embodiment of the present invention (e.g., mail transfer module 525, parsing module 530, and tracking module 535 of FIG. 5, and supporting code for performing the functions and processes 100, 200, 300, 400, 600, 700, 800 detailed above in FIGS. 1-4 and 6-8). Disk storage 1075 provides non-volatile storage for computer software instructions 1080 and data 1090 used to implement the methods and systems disclosed herein. Central processor unit 1050 is also attached to the system bus 1030 and provides for the execution of computer instructions.

In one embodiment, the processor routines 1080 and data 1090 are a computer program product (generally referenced 1080), including a computer readable medium (e.g., a removable storage medium such as one or more DVD-ROM's, CD-ROM's, diskettes, tapes, or a portal server medium, etc.) that provides at least a portion of the software instructions for the invention system. Computer program product 1080 can be installed by any suitable software installation procedure, as is well known in the art. In another embodiment, at least a portion of the software instructions may also be downloaded over a cable, communication and/or wireless connection.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of tracking correspondence between a plurality of users and contacts in a tracking system, the method comprising:

executing said tracking system, the tracking system is structured such that a plurality of users coordinate managing interactions between the plurality of users and a given contact, and for different contacts, there being different activity records of the tracking system, the tracking system being structured according to contact and automatically logs ongoing interactions between the plurality of users and each different contact in a different activity record associated to the different contact, the different activity records being associated to the different contact in a manner that enables tracking ongoing interactions of the different contact with multiple different users, wherein the executing of the tracking system includes:

monitoring electronic mail messages between the plurality of users and the given contact;

automatically making a copy of an electronic mail message for the tracking system;

parsing the copy of the electronic mail message to determine a sender and a recipient of the electronic mail message;

searching a database of the tracking system for the sender and the recipient; and adding the copy of the electronic mail message to an activity record for the given contact in the database, if the sender or the recipient is the given contact found in the database, the activity record containing a log of ongoing interaction between the given contact and the plurality of users.

2. The method of claim 1, wherein adding the copy of the electronic mail message to the activity record includes adding an indication as to whether activity associated with the copy of the electronic mail message is inbound activity or outbound activity.

3. The method of claim 2, wherein the copy of the electronic mail message is added to an activity record for the sender of the electronic mail message, if the electronic mail message is an inbound message.

4. The method of claim 2, wherein the copy of the electronic mail message is added to an activity record for the recipient of the electronic mail message, if the electronic mail message is an outbound message.

5. The method of claim 1, further comprising deleting the copy of the electronic mail message, if neither the sender nor the recipient is found in the database.

6. The method of claim 1 further comprising, detecting an electronic invitation for a calendar event included in the copy of the electronic mail message.

7. The method of claim 6, further comprising storing information about the calendar event in the database.

8. The method of claim 6, further comprising searching the database for one or more invitees of the calendar event.

9. The method of claim 8, further comprising adding information about the calendar event to an activity record for each of the one or more invitees in the database.

10. The method of claim 6, further comprising, if the electronic invitation is a cancellation, deleting information about the calendar event from the database, including deleting information about the calendar event from the activity record for each of the one or more invitees of the calendar event.

11. A computer system for tracking correspondence between a plurality of users and contacts in a tracking system, the system comprising:

a processor configured to execute said tracking system, the tracking system is structured such that a plurality of users coordinate managing interactions between the plurality of users and a given contact, and for different contacts, there being different activity records of the tracking system, the tracking system being structured according to contact and automatically logging ongoing interactions between the plurality of users and each different contact in a different activity record associated to the different contact, the different activity records being associated to the different contact in a manner that enables tracking ongoing interactions of the different contact with multiple different users; and a memory with computer software instructions stored thereon, the memory operatively coupled to the processor such that, when executed by the processor, the software instructions cause the processor to implement:

a mail transfer module to monitor electronic mail messages between the plurality of users and the given contact and to automatically make a copy of an electronic mail message for the tracking system;

a parsing module to parse the copy of the electronic mail message to determine a sender and a recipient of the electronic mail message, and to search a database of the tracking system for the sender and the recipient; and a tracking module to add the copy of the electronic mail message to an activity record for the given contact in the database, if the sender or the recipient is the given contact found in the database, the activity record containing a log of ongoing interaction between the given contact and the plurality of users.

12. The computer system of claim 11, wherein the tracking module adds an indication to the activity record as to whether activity associated with the copy of the electronic mail message is inbound activity or outbound activity.

13. The computer system of claim 12, wherein the tracking module adds the copy of the electronic mail message to an activity record for the sender, if the electronic mail message is an inbound message.

14. The computer system of claim 12, wherein the tracking module adds the copy of the electronic mail message to an activity record for the recipient, if the electronic mail message is an outbound message.

15. The computer system of claim 11, wherein the tracking module deletes the copy of the electronic mail message, if neither the sender nor the recipient is found in the database.

16. The computer system of claim 11, wherein the parsing module determines whether the copy of the electronic mail message includes an electronic invitation for a calendar event.

17. The computer system of claim 16, wherein the tracking module stores information about the calendar event in the database.

18. The computer system of claim 16, wherein the parsing module searches the database for one or more invitees of the calendar event.

19. The computer system of claim 18, wherein the tracking module adds information about the calendar event to an activity record for each of the one or more invitees of the calendar event.

20. The computer system of claim 16, wherein the tracking module, if the electronic invitation is a cancellation, deletes information about the calendar event from the database, which includes deleting information about the calendar event from the activity record for each of the one or more invitees of the calendar event.

21. A non-transitory computer readable medium having computer readable program codes embodied therein, the computer readable medium comprising:

a portion of the computer readable medium enabling computer readable program codes that configure a processor to track correspondence between a plurality of users and contacts in a tracking system, the computer readable medium program codes including instructions that, when executed by the processor, cause the processor to:

execute said tracking system, the tracking system is structured such that a plurality of users coordinate managing interactions between the plurality of users and a given contact, and for different contacts, there being different activity records of the tracking system, the tracking system being structured according to contact to automatically log ongoing interactions between the plurality of users and each different contact in a different activity record associated to the different contact, the different activity records being associated to the different contact in a manner that enables tracking ongoing interactions of the different contact with multiple different users, wherein the tracking system is executed to:

monitor electronic mail messages between the plurality of users and the given contact;

automatically make a copy of an electronic mail message for the tracking system;

parse the copy of the electronic mail message to determine a sender and a recipient of the electronic mail message;

search a database of the tracking system for the sender and the recipient; and add the copy of the electronic mail message to an activity record for the given contact in the database, if the sender or the recipient is the given contact found in the database, the activity record being associated with the tracking system containing a log of ongoing interaction between the given contact and the plurality of users.

* * * * *